United States Patent
Liao

(10) Patent No.: US 12,149,494 B2
(45) Date of Patent: Nov. 19, 2024

(54) USER IDENTIFICATION DISPLAY METHOD AND APPARATUS IN MAIL SHARING, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/818,661

(22) Filed: Aug. 9, 2022

(65) Prior Publication Data

US 2022/0385618 A1 Dec. 1, 2022

Related U.S. Application Data

(63) Continuation of application No. PCT/CN2021/087701, filed on Apr. 16, 2021.

(30) Foreign Application Priority Data

Apr. 30, 2020 (CN) .......................... 202010368140.X

(51) Int. Cl.
*H04L 51/56* (2022.01)
*G06Q 10/107* (2023.01)
(Continued)

(52) U.S. Cl.
CPC ............ *H04L 51/42* (2022.05); *G06Q 10/107* (2013.01); *H04L 51/04* (2013.01); *H04L 51/56* (2022.05)

(58) Field of Classification Search
CPC ....... H04L 51/42; H04L 51/04; H04L 51/046; H04L 51/043; H04L 51/56; G06Q 10/107
See application file for complete search history.

(56) References Cited

U.S. PATENT DOCUMENTS 6,791,583 B2 * 9/2004 Tang ...................... G06Q 10/10
715/751
7,941,762 B1 * 5/2011 Tovino .............. H04M 3/42365
715/708
(Continued)

FOREIGN PATENT DOCUMENTS

CN 1376004 A 10/2002
CN 102761840 A 10/2012
(Continued)

OTHER PUBLICATIONS

"Google Docs Real Time Collaboration Demo," jesuitnet, Apr. 22, 2011, YouTube.com, available at https://youtu.be/mr_qvgQJxbY ( video), 2 minutes and 44 seconds. (Year: 2011).*
(Continued)

*Primary Examiner* — Dino Kujundzic

(57) ABSTRACT

An information display method and apparatus, an electronic device, and a storage medium are provided. The method includes: on the basis of an email sharing operation triggered by a sharer, sharing, according to sharee information, a target email to a sharee corresponding to the sharee information; obtaining a first identifier corresponding to the sharee; and displaying, on an email display interface of the target email on an email client of the sharer, the first identifier corresponding to the sharee. The technical solution can simplify user viewing operations, thus increasing information viewing efficiency and improving user experience.

24 Claims, 7 Drawing Sheets

(51) Int. Cl.
  *H04L 51/04* (2022.01)
  *H04L 51/42* (2022.01)

(56) References Cited

U.S. PATENT DOCUMENTS

| | | | |
|---|---|---|---|
| 8,375,309 B2* | 2/2013 | Fioretti | H04L 51/046 |
| | | | 715/753 |
| 2002/0137539 A1 | 9/2002 | Takahashi et al. | |
| 2004/0078448 A1* | 4/2004 | Malik | H04L 63/102 |
| | | | 709/206 |
| 2006/0095514 A1 | 5/2006 | Wang et al. | |
| 2009/0049141 A1* | 2/2009 | Jones | G06Q 10/107 |
| | | | 709/206 |
| 2009/0119606 A1* | 5/2009 | Gilbert | G06Q 10/107 |
| | | | 715/758 |
| 2009/0177617 A1* | 7/2009 | Lee | G06F 16/48 |
| 2012/0110474 A1* | 5/2012 | Chen | G06F 3/04817 |
| | | | 715/753 |
| 2013/0031185 A1* | 1/2013 | Wyatt | G06Q 10/107 |
| | | | 709/206 |
| 2013/0151633 A1 | 6/2013 | Hazarika | |
| 2013/0159429 A1* | 6/2013 | Nalliah | H04L 51/214 |
| | | | 709/206 |
| 2014/0082633 A1 | 3/2014 | Kim et al. | |
| 2016/0234135 A1* | 8/2016 | Kim | H04L 51/08 |
| 2016/0366077 A1* | 12/2016 | Dong | H04L 51/56 |
| 2018/0191645 A1* | 7/2018 | Cacioppo | H04L 67/06 |
| 2018/0270247 A1* | 9/2018 | Wada | H04L 51/216 |
| 2019/0190876 A1* | 6/2019 | Weinhold | G06Q 50/01 |
| 2021/0067475 A1 | 3/2021 | Chen et al. | |
| 2021/0067570 A1 | 3/2021 | Chen et al. | |

FOREIGN PATENT DOCUMENTS

| | | |
|---|---|---|
| CN | 103001856 A | 3/2013 |
| CN | 103268541 A | 8/2013 |
| CN | 106161201 A | 11/2016 |
| CN | 108055196 A | 5/2018 |
| CN | 108055197 A | 5/2018 |
| CN | 108156070 A | 6/2018 |
| CN | 108306810 A | 7/2018 |
| CN | 110297717 A | 10/2019 |
| CN | 111581924 A | 8/2020 |
| EP | 3402136 A1 | 11/2018 |
| IN | 108322384 A | 7/2018 |
| JP | 2013544396 A | 12/2013 |
| JP | 2016514296 A | 5/2016 |
| JP | 2016212477 A | 12/2016 |
| JP | 2017516174 A | 6/2017 |
| WO | 2019137292 A1 | 7/2019 |

OTHER PUBLICATIONS

First Office Action received in 2021 for CN Application No. 202010368140.X, English Translation (21 pages).
Search Report and Written Opinion mailed Jun. 28, 2021 in PCT Application No. PCT/2021/087701, English Translation of Search Report only (13 pages).
Notice of Reasons for Refusal issued Nov. 21, 2023 in Japanese Application No. 2022-564641, with English translation (12 pages).
Chimu, English blog translation: Teams new features summary 2019 Ignite version, Jan. 4, 2020, https://teamschannel.com/englishblog-2019-ignite.
Illuminate Japan, Teams: Easy to find group chats, Jan. 27, 2020, https://www.illuminate-j.jp/blog/teamstips7-2.
Extended European Search Report issued Aug. 10, 2023 for European Application No. 21795442.9 (8 pages).
Aizawa Y., "From the basics to the advanced: Essential techniques for improving Gmail efficiency Email replies and threads", Aug. 10, 2015, 6 pages.
Office action received from Japanese patent application No. 2022-564641 mailed on Mar. 19, 2024, 12 pages (6 pages English Translation and 6 pages Original Copy).

* cited by examiner

Mail group List in an inbox

Preset sharing button

| | Search bar | 📄 📋 ◎ ⊠ ⊡ ⚙ ⬥ ⬛ | ◯ |
|---|---|---|---|
| Inbox | All▼ | 123aaabbb | |
| Outbox | ZHANG San, LI Si  18:14<br>123aaabbb  [2] | Sender:ZHANG San<zhangsan@xxx.com>Time:January 13, 2020, 18:14 [Forward] [Reply]<br>Recipient:LI Si<lisi@xxx.com>,me | |
| Draft box | WANG San  1-5<br>12222222  [3] | Hello | |
| Deleted mails | | | |
| Spam mails | WANG Si  1-3<br>2222222<br>X Brief information of mail content X | Sender:LI Si<lisi@xxx.com>  Time:January 12, 2020, 11:12 [Forward] [Reply]<br>Recipient:ZHANG San<zhangsan@xxx.com>, me<br>X Brief information of mail content X | |
| | WANG Wu  1-1<br>2222222<br>X Brief information of mail content X | | |

| Inbox | Search bar | 123aaabbb | Profile of user A | Profile of user B | +18 | Second abbreviative display identification |
|---|---|---|---|---|---|---|
| | All▼ | | | | | |
| Outbox | ZHANG San, LI Si 18:14 123aaabbb  [2] | Sender:ZHANG San<zhangsan@xxx.com>  Time:January 13, 2020, 18:14  [Forward][Reply] | | | | |
| Draft box | WANG San 1-5 12222222 [3] | Recipient:LI Si<lisi@xxx.com>,me  Hello | | | | |
| Deleted mails | | | | | | |
| Spam mails | WANG Si 1-3 2222222 X Brief information of mail content X | Sender:LI Si<lisi@xxx.com>   Time:January 12, 2020, 11:12 [Forward][Reply] Recipient:ZHANG San<zhangsan@xxx.com>, me  X Brief information of mail content X | | | | |
| | WANG Wu 1-1 2222222 X Brief information of mail content X | | | | | |

Figure 7

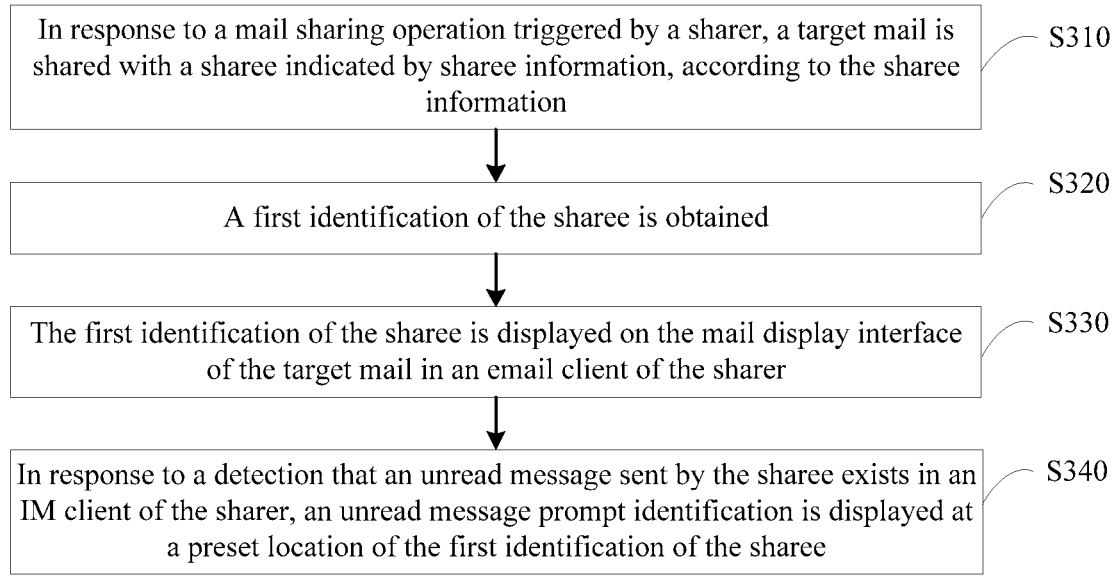

Figure 8

USER IDENTIFICATION DISPLAY METHOD AND APPARATUS IN MAIL SHARING, AND STORAGE MEDIUM

The present application is a continuation of International Application No. PCT/CN2021/087701, filed on Apr. 16, 2021 which claims the priority to Chinese Patent Application No. 202010368140.X, titled "INFORMATION DISPLAY METHOD AND APPARATUS, ELECTRONIC DEVICE AND STORAGE MEDIUM", filed on Apr. 30, 2020 with the State Intellectual Property Office of the PRC, both of which are incorporated herein by reference in their entireties.

FIELD

The present disclosure relates the computer technical field, and in particular to an information display method, an information display apparatus, an electronic device and a storage medium.

BACKGROUND

With quick development of the computer technology and increasing of user requirements, the user requires to share a mail with other users, so that other users obtain and discuss content of the mail.

SUMMARY

An information display method, an information display apparatus, an electronic device and a storage medium are provided according to embodiments of the present disclosure, so as to improve information viewing efficiency and user experience.

In a first aspect, an information display method is provided according to an embodiment of the present disclosure. The method includes:
  sharing, in response to a mail sharing operation triggered by a sharer, a target mail with a sharee indicated by sharee information, according to the sharee information;
  obtaining a first identification of the sharee; and
  displaying the first identification of the sharee on a mail display interface of the target mail in an email client of the sharer.

In a second aspect, an information display method is provided according to an embodiment of the present disclosure. The method includes:
  obtaining a target mail which is shared by a sharer in response to a mail sharing operation;
  obtaining a second identification of the sharer; and
  displaying the second identification of the sharer on a mail display interface of the target mail in an email client of a sharee.

In a third aspect, a message display apparatus is provided according to an embodiment of the present disclosure. The apparatus includes a target mail sharing module, a first identification obtaining module and a first identification display module.

The target mail sharing module is configured to share, in response to a mail sharing operation triggered by a sharer, a target mail with a sharee indicated by sharee information, according to the sharee information.

The first identification obtaining module is configured to obtain a first identification of the sharee.

The first identification display module is configured to display the first identification of the sharee on a mail display interface of the target mail in an email client of the sharer.

In a fourth aspect, an information display apparatus is provided according to an embodiment of the present disclosure. The apparatus includes a target mail obtaining module, a second identification obtaining module and a second identification display module.

The target mail obtaining module is configured to obtain a target mail, wherein the target mail is shared by a sharer in response to a mail sharing operation.

The second identification obtaining module is configured to obtain a second identification of the sharer.

The second identification display module is configured to display the second identification of the sharer on a mail display interface of the target mail in an email client of a sharee.

In a fifth aspect, an electronic device is further provided according to an embodiment of the present disclosure. The electronic device includes: one or more processors; and a memory configured to store one or more programs, where the one or more programs, when executed by the one or more processors, cause the one or more processors to perform the information display method according to the embodiments of the present disclosure.

In a sixth aspect, a computer readable storage medium storing computer programs is further provided according to an embodiment of the present disclosure. The programs are executed by a processor to perform the information display method according to the embodiment of the present disclosure.

According to the technical solution described in the embodiments of the present disclosure, in response to the mail sharing operation triggered by the sharer, the target mail is shared to the sharee indicated by the sharee information, according to the sharee information. The first identification of the sharee is displayed on the mail display interface in the email client of the sharer, so that the sharer can quickly view users receiving the target mail in the email client directly. Alternatively, the second identification of the sharer is displayed on the mail display interface of the target mail in the email client of the sharee, so that the sharee can quickly view the sharer of the target mail directly in the email client, thereby improving information viewing efficiency and user experience.

BRIEF DESCRIPTION OF THE DRAWINGS

In conjunction with the drawings and with reference to the following implementations, the above and other features, advantages ad aspects of the embodiments of the present disclosure will become more apparent. Throughout the drawings, the same or similar reference numerals indicate the same or similar elements. It should be understood that, the drawings are schematic, and the devices and elements are unnecessary to be drawn to scale.

FIG. 3 is an example showing another email interface involved in the first embodiment of the present disclosure;

FIG. 4 is an example showing a first identification involved in the first embodiment of the present disclosure;

FIG. 5 is an example showing a sharing success prompt identification involved in the first embodiment of the present disclosure;

FIG. 7 is an example showing a first identification of a sharee involved in the second embodiment of the present disclosure;

FIG. 8 is a schematic flowchart of an information display method according to a third embodiment of the present disclosure;

DETAILED DESCRIPTION OF EMBODIMENTS

Figure 1:
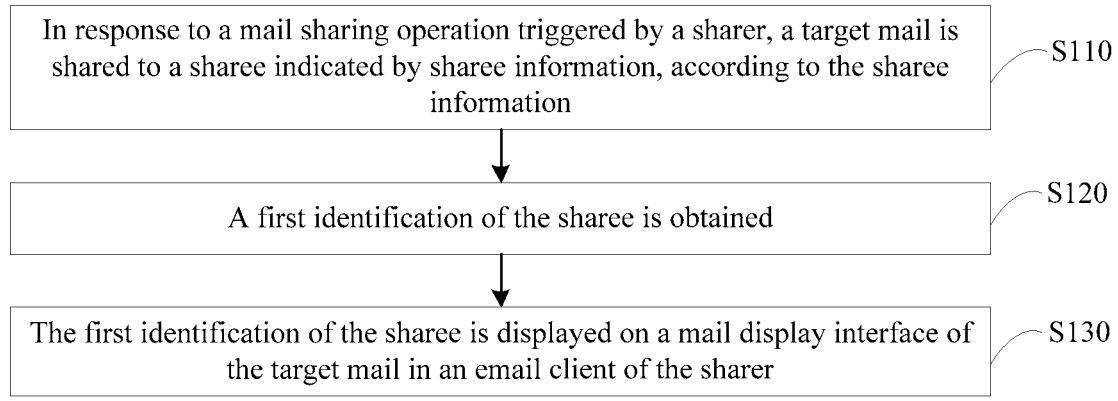
FIG. 1 is a schematic flowchart showing an information display method according to a first embodiment of the present disclosure.

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

It is found by the applicant that, in some implementations, after a sharer shares a mail to sharees, the sharer needs to switch from an email client to an IM (instant messaging) client, to view the sharees receiving the mail based on a sharing record on the IM client; or the sharee needs to switch from the email client to the IM client, to view the sharer sharing the target mail on the IM client. Thus, the viewing operations are complicated, and thus information viewing efficiency and user experience are reduced. In view of this, in some implementations of the present disclosure, in response to a mail viewing operation triggered by a sharer, a target mail is shared with the sharee indicated by sharee information according to the sharee information; a first identification of the sharee is displayed on a mail display interface of the target mail in an email client of the sharer. In this way, the sharer can quickly view users receiving the target mail directly in the email client. Alternatively, a second identification of the sharer is displayed on a mail display interface of the target mail in the email client of the sharee, so that the sharee can quickly view a sharer sharing the target mail directly in the email client, thereby improving the information viewing efficiency and user experience.

First Embodiment

FIG. 1 is a schematic flowchart of an information display method according to a first embodiment of the present disclosure. The embodiment may be applied to a case that an identification of a sharee is displayed on a shared target mail. The method may be performed by an information display apparatus. The apparatus may be implemented by software and/or hardware and is integrated in an email client of the sharer. The email client may be integrated in a PC (Personal Computer) end or a mobile terminal. As shown in FIG. 1, the method includes steps S110 to S130 as follows.

In S110, in response to a mail sharing operation triggered by a sharer, a target mail is shared to a sharee indicated by sharee information, according to the sharee information.

The sharer may be a user who expects to perform a mail sharing operation. The sharee information may include at least one piece of user information and/or at least one piece of user group information. The user information may include, but not be limited to, a user account name. The user group information may include, but not be limited to, a user group name. The sharee indicated by sharee information may include a user indicated by each piece of user information, and/or users included in a user group indicated by each piece of user group information. The number of the sharee may be one or more. The sharee information may include IM information of the sharee, by which the target mail is shared to an IM client corresponding to the sharee. Alternatively, the sharee information may include email information of the sharee, by which the target mail is shared to an email client of the sharee. The target mail may refer to at least one mail to be shared currently.

Figure 2:
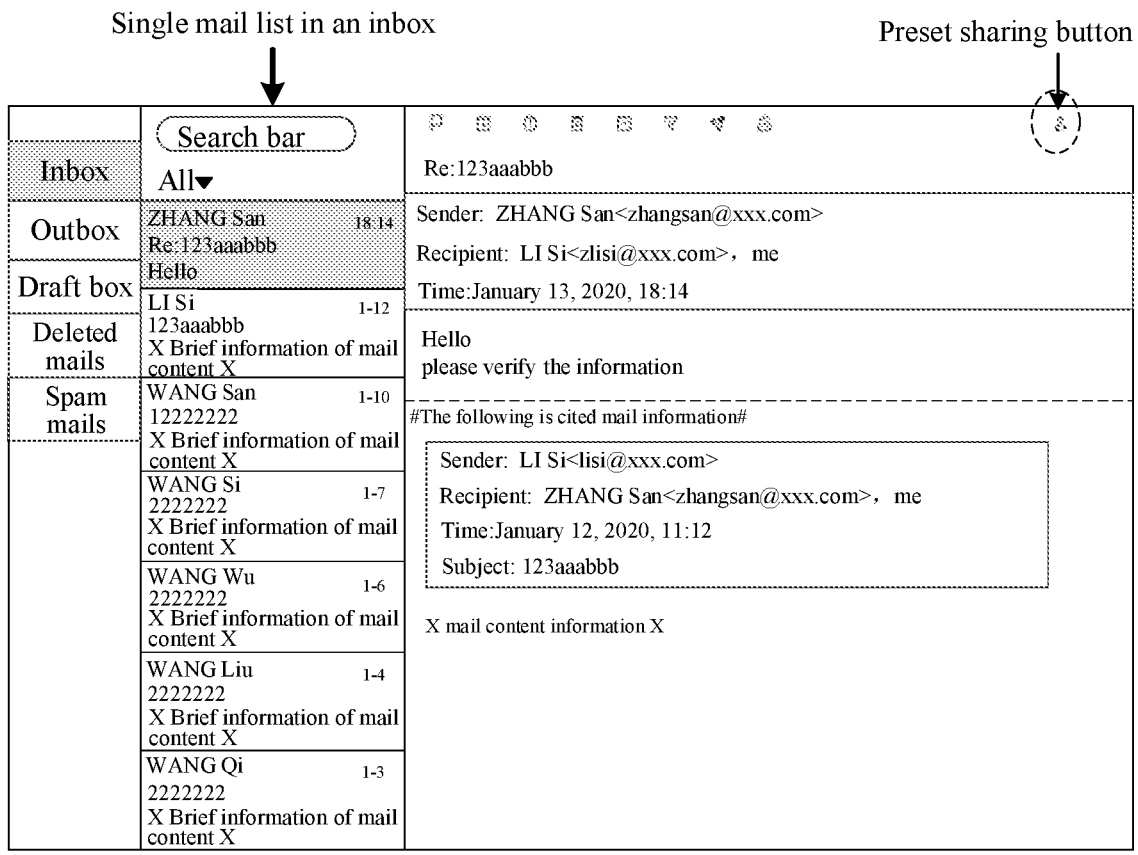
FIG. 2 is an example showing an email interface involved in the first embodiment of the present disclosure.

In an embodiment, the target mail may be determined based on a mail sharing operation triggered by the sharer. In an implementation, if each mail is stored independently in the email, a preset sharing button may be provided on a mail display interface of each mail in the email. In this way, a mail sharing operation may be triggered for one mail by clicking the preset sharing button of the mail. For example, in FIG. 2, a preset sharing button (in a dashed circle in FIG. 2) is provided on a mail display interface of the first mail in a list of single mails in an inbox. The mail sharing operation is triggered for this mail by clicking the preset sharing button. If mails are classified and stored in a form of mail group in the email, a preset sharing button may be provided in a display interface of each mail group. For example, in FIG. 3, a preset sharing button (in a dashed circle in FIG. 3) is provided on a display interface of the first mail group in a mail group list in the inbox. The mail sharing operation is triggered for the mail group by clicking the preset sharing button. Alternatively, the preset sharing button may be provided on mail display interfaces of all mails in the mail group. The mail sharing operation is triggered for each mail in the mail group by clicking the preset sharing button thereof. Each mail group in the email may be used to store mails matching with the mail group, so as to classify and store the mails. For example, mails with the same subject information and the same recipient information may be stored in one mail group; or mails with the same subject information and with a referential relationship may be stored in the same mail group.

In an embodiment, the first mail may be determined as a target mail, in response to a detection of the mail sharing operation triggered by the sharer clicking the preset sharing button on the mail display interface of the first mail. Alternatively, if each mail is stored independently in the email, information of a first mail is matched with information of other mails in the email to determine a second mail matching with the first mail, and a target mail to be shared currently is determined from the second mail. Alternatively, if mails are stored in a form of mail group, all mails in the mail group including the first mail is determined as the second mail matching with the first mail, and a target mail to be shared currently is determined from the second mail. For example, each second mail matching with the first mail may be determined as the target mail. Alternatively, the second mails may be displayed on the display interface, and the sharer can select a mail to be shared based on requirement. In this way, the target mail to be shared currently is obtained based on the selection of the user, thereby improving mail sharing flexibility and satisfying the personalized requirement of the user. The first mail may include: a mail in an edit state, a received mail in an inbox, a sent mail in an outbox, or an edited mail stored in a draft box. The mail in an edit state may be a new editable mail generated in response to a mail writing operation triggered by the sharer. The second mail may include the first mail and/or other mail.

In an embodiment, each mail in the first mail group may be determined as the target mail, in response to a detection of a mail sharing operation triggered by the sharer clicking the preset sharing button on the display interface of the first mail group. Alternatively, all mails in the first mail group are displayed on the display interface, and the sharer can select a mail to be shared based on requirement. In this way, the target mail to be shared currently is obtained based on the selection of the user, thereby improving mail sharing flexibility.

The email client of the sharer displays a display interface for obtaining sharee information, in response to a detection of the mail sharing operation triggered by the sharer. The sharer can input the sharee information manually on the display interface; or select required sharee information from displayed information of candidate sharee. In this way, the sharee information may be obtained based on the input or selection of the user. According to the sharee information, the target mail is shared to the sharee indicated by the sharee information, thereby displaying the target mail on a client of the sharee. For example, the target mail is shared to the sharee indicated by IM information of the sharee, so that the target mail is displayed in an association manner on an IM client interface of the sharee. For example, the target mail may be directly displayed on the IM client interface of the sharee. Alternatively, target mail sharing prompt information is displayed on the IM client interface of the sharee, and the target mail is displayed on an email client interface of the sharee. In this way, the sharee views the target mail in the email client of the sharee based on the mail sharing prompt information, thereby sharing the mail from the email client to the IM client. In an example, the target mail is shared with a sharee indicated by email information of the sharee, and the target mail is displayed on the email client interface of the sharee, thereby sharing the mail from the email client to the email client. When the sharer needs to share multiple target mails matching with the first mail, the multiple target mails matching with the first mail can be shared with the sharee at one time, thereby simplifying the mail sharing operation and improving the mail sharing efficiency.

It should be noted that the target mail shared by the mail sharing operation may be controlled by the sharer. In an embodiment, operation permission for the target mail of the sharee obtained by sharing of the sharer is a temporal permission. The temporary permission of the sharee for the target mail is limited by an operation triggered by the sharer. For example, in response to a sharing end operation triggered by the sharer, the target mail becomes invisible for the sharee. If the target mail is a received mail or a sent mail in the email of the sharer, the sharer does not modify content of the target mail when sharing the target mail. That is, the receiving end may display at least a part of the target mail determined based on the temporary permission as the target mail, regardless a type of the temporary permission assigned to the sharee by the sharer. The sharer may set different mail processing permissions for different receivers. Compared with forwarding a mail, the mail forwarded by a mail forwarding operation is a mail which has been received by a forwarder. Thus, the forwarded mail is not controlled by the forwarder. In addition, content of a mail to be forwarded in the email can be modified, and different receivers of the forwarded mail have the same mail processing permission. Thus, the mail sharing operation differs from the existing mail forwarding operation.

In S120, a first identification of the sharee is obtained.

Each sharee may have a unique first identification, so that different sharees can be distinguished based on different first identifications. The first identification may include, but not limited to, an avatar identification and/or an account identification of the sharee. The avatar identification of the sharee may include, but not limited to, a picture and a name of the sharee. The name of the sharee may include, but not limited to, a Chinese full name, an English full name, a Chinese abbreviation name or an English abbreviation name. The account identification of the sharee may include, but not limited to, an IM account name or an email account name. The email account name may be a complete mail account name or a mail prefix name. In an embodiment, when the sharer shares the target mail to the IM client of the sharee or to both the IM client and the email client of the sharee simultaneously, an identification of the sharee in the IM client serves as the first identification of the sharee. When the sharer shares the target mail to only the email client of the sharee, an identification of the sharee in the email client serves as the first identification of the sharee.

It should be noted that the sharee, the first identification of which may be obtained, is all sharees in step S110 or a part of the sharees in step S110. For example, the first identification of the sharee currently accessing the target mail is only obtained.

If the first identification of the sharee is pre-stored in the email client of the sharer, the first identification of the sharee is obtained locally. For example, if the information of the sharee is email information of the sharee, the first identifications of respective mail users may be pre-stored in the email client of the sharer, thereby directly obtaining the first identification of the sharee locally. If the first identification of the sharee is not stored in the email client of the sharer, the first identification of the sharee may be obtained by remotely invoking a server.

In an embodiment, the S120 may include: if the sharee information includes a user group name, the first identification of the sharee is determined according to the user group name. The user group name may include an IM user group name and a mail user group name.

If the user group name includes the email user group name, the email client of the sharer may obtain, based on pre-stored first identifications of respective email users, a first identification of each email user in an email user group indicated by the email user group name, thereby quickly obtaining the first identification of the sharee locally.

If the user group name includes an IM user group name, the process of determining a first identification of the sharee according to the user group name may include: generating an identification obtaining request according to the IM user group name; sending the identification obtaining request to an IM server, to instruct the IM server to determine identifications of respective IM users indicated by the IM user group name in response to the identification obtaining request; and obtaining the first identification of the sharee according to the identifications of the respective IM users sent by the IM server. Specifically, the email client of the sharer may obtain the first identifications of the IM users in the IM user group by interacting with the IM server.

In step S130, the first identification of the sharee is displayed on mail display interface of the target mail in the email client of the sharer.

Figures 4, 5:
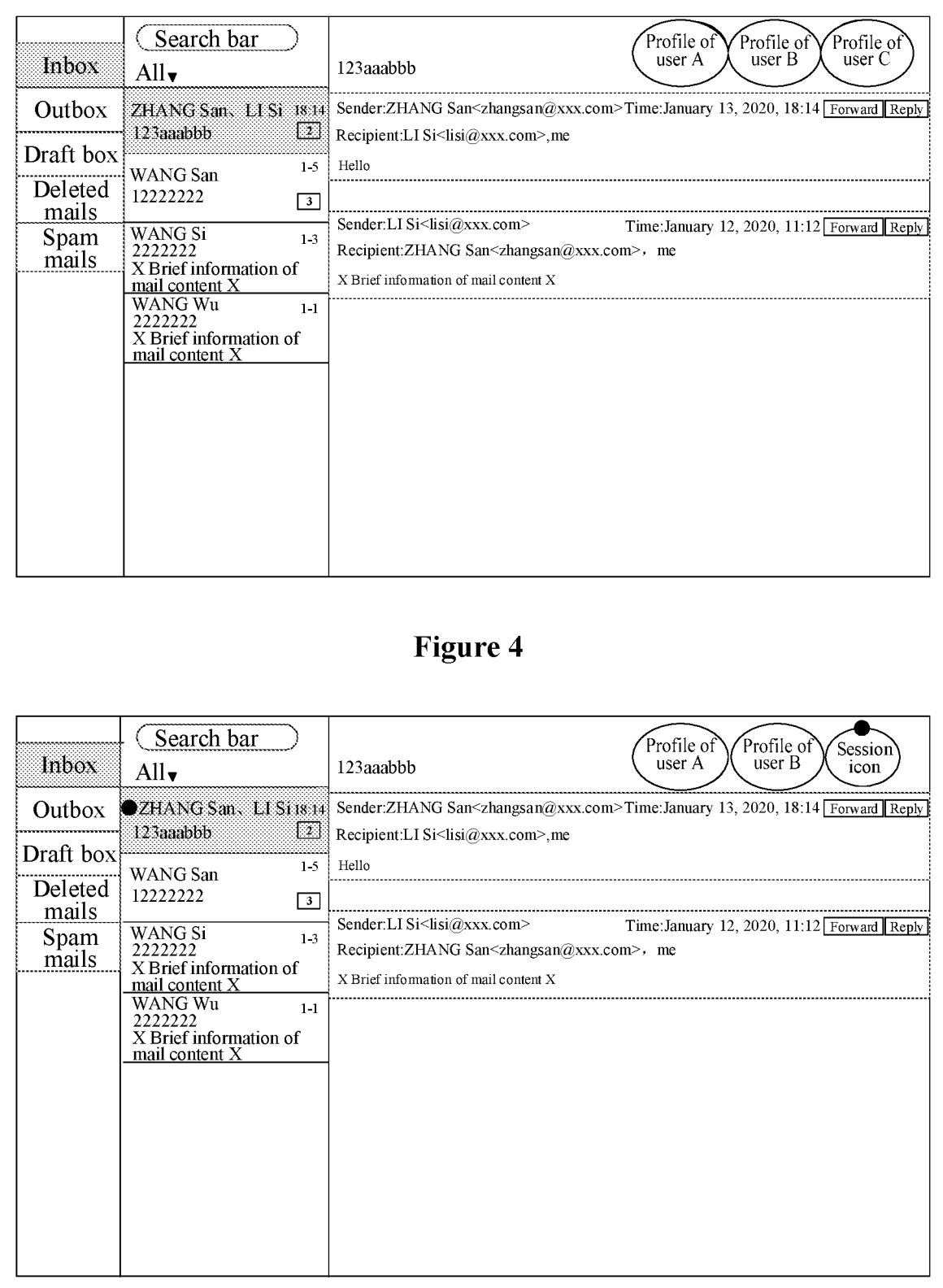

Any blank position in the mail display interface may serve as a preset position for displaying the first identification. In an embodiment, if emails are classified and stored in a form of email group in the email and the target email is each mail in the mail group, the first identification of the sharee may be displayed on a mail display interface of each target mail; or be displayed on a display interface of the mail group including the target mail, to uniformly prompt users receiving the mail in the mail group. For example, FIG. 4 is an example showing the first identification. As shown in FIG. 4, two mails in the first mail group in the inbox are shared with three users A, B and C. Avatar identifications of the three users may be displayed at the top of the display interface of the mail group.

After the sharer shares the target mail with the sharee, the first identification of the sharee may be displayed at a preset position in the mail display interface of the target mail in the email client of the sharer, to prompt the sharer of users receiving the target mail. In this way, the sharer can quickly view the users receiving the target mail in the email client directly without switching to the email client. For example, when the mail is shared to the IM user, the sharer is unnecessary to switch from the email client to the IM client, so as to view each IM user receiving the target mail based on a sharing record in the IM client. Thus, the user viewing operation is simplified, and the information viewing efficiency and user experience are improved.

In an embodiment, the process of displaying the first identification of the sharee on the mail display interface of the target mail in the email client of the sharer in S130 may include the following cases. In one case, if the first identifications of all the sharees are obtained in S120, the first identifications of all the sharees are displayed. In the other case, if the first identification of a part of the sharees is obtained in S120, the first identification of the part of the sharees is displayed. For example, if the first identification of the sharee viewing the target mail is obtained, the first identification of the sharee currently viewing the target mail is displayed on the mail display interface.

In an embodiment, S130 may include: displaying the first identification of the sharee and the second identification of the sharer on the mail display interface of the target mail in the email client of the sharer. The second identification may include but not limited to an avatar identification and an account identification of the sharer. In the embodiment, both the first identification of the sharee and the second identification of the sharer are displayed on the mail display interface of the target mail in the email client of the sharer, so as to prompt the sharer that the target mail is shared actively by the sharer. When both the first identification of the sharee and the second identification of the sharer are displayed, the second identification of the sharer may be displayed at a specific position, so as to prompt the sharer clearly. For example, when all identifications are displayed horizontally (as shown in FIG. 4), the second identification of the sharer may be displayed in front of the first identifications of the sharee, thereby further improving viewing experience of the sharer.

According to the technical solution in the embodiments of the present disclosure, in response to the mail sharing operation triggered by the sharer, the target mail is shared with the sharee indicated by sharee information, according to the sharee information, and the first identification of the sharee is displayed on the mail display interface of the target mail in the email client of the sharer. In this way, the sharer can quickly view the users receiving the target mail in the email client directly, thereby improving the information viewing efficiency and user experience.

Based on the above technical solution, S130 may include: detecting whether a mail viewing operation for the target mail is triggered by the sharee; if the mail viewing operation for the target mail is not triggered by the sharee, displaying the first identification of the sharee in a first identification display mode on the mail display interface of the target mail in the email client of the sharer; and if the mail viewing operation for the target mail is triggered by the sharee, switching a display mode of the first identification from the first identification display mode to a second identification display mode.

The first identification display mode may differ from the second identification display mode. For example, the first identification display mode and the second identification display mode may be distinguished by different display colors. For example, the first identification display mode may be gray scale display, and the second identification mode may be highlight display. In another example, in the first identification mode, a preset identification is added on the first identification; and in the second identification mode, no preset identification is added on the first identification. The preset identification may indicate that the sharee does not view the mail.

In an embodiment, after the target mail is shared to the sharee indicated by the sharee information, the email client of the sharer can detect the mail viewing operation triggered for the target mail by each sharee in real time, so as to determine the display mode of the first identification based on whether the sharee views the target mail. For example, in the client of the sharee, the sharee may trigger the mail viewing operation by clicking the obtained target mail. In response to the mail viewing operation triggered by the sharee, the client of the sharee may add information indicating that the target mail has been viewed, in a message queue. The email client of the sharer can determine whether the sharee has viewed the target mail, by monitoring the message queue in real time. If the email client of the sharer does not detect the mail viewing operation triggered for a specific sharee, it is indicated that the sharee does not view the target mail. In this case, the first identification of the sharee may be displayed in the first identification display mode on the mail display interface of the target mail. If the email client of the sharer detects the mail viewing operation triggered for a specific sharee, it is indicated that the sharee has viewed the target mail. In this case, the displayed first identification of the sharee may be re-displayed in the second identification display mode. In this way, the first identification are displayed in different identification display modes, so that the information whether the sharee has viewed the target mail is prompted to the sharer, thereby further improving the user experience.

Based on the above technical solutions, after S130, the method may further include: displaying, in response to a detection of an adding operation for adding the sharee, a first identification of the currently added sharee on the mail display interface of the target mail in the email client of the sharer; and deleting, in response to a deleting operation for deleting an existing sharee, a displayed first identification of the existing sharee.

In an embodiment, after the target mail is shared to the sharee indicated by the sharee information, a sharee having an adding permission or the sharer may further add a sharee, so as to share the target mail to the added sharee. For example, a sharee adding button may be provided on the mail display interface of the target mail. The sharee having an adding permission or the sharer may trigger the adding operation of the sharee by clicking the sharee adding button. In response to a detection of the adding operation for adding the sharee triggered by the sharee having the adding permission or the sharer, a first identification of a currently added sharee may be obtained, and the obtained first identification is displayed on the mail display interface of the target mail, so as to synchronously display all users who have currently received the target mail. After the target mail is shared to the sharee indicated by the sharee information, the sharee having a deleting permission or the sharer may delete the existing sharee, so as to delete the target mail which has been shared to the existing sharee. In this way, the shared mail may be controlled in real time. In response to a detection of the deleting operation for deleting the existing sharee triggered by the sharee having the deleting permission or the sharer, the displayed first identification of the existing sharee is deleted on the mail display interface, thereby deleting the first identification synchronously to ensure display accuracy of the first identification.

Based on the above technical solution, after S110, the method may further include: displaying a sharing success prompt identification on the mail display interface of the target mail in the email client of the sharer.

In an embodiment, the sharing success prompt identification may indicate that the sharer successfully shares the target mail for the first time, to prompt the sharer that the mail has been successfully shared. The sharing success prompt identification may be represented by a special symbol or a graph. For example, FIG. 5 is an example showing a sharing success prompt identification. In FIG. 5, the sharing success prompt identification is represented by a black dot.

In the email client of the sharer, the sharing success prompt identification may be displayed at a preset location of a target cell in a mail list including the target mail. The target cell may be used to display abbreviative information of the target mail. The abbreviative information of the target mail may include, but not limited to, at least one of a recipient, a sender, subject information and text abstract information of the target mail. For example, in FIG. 5, the sharing success prompt identification may be displayed at a blank position on the left of the recipient displayed in the target cell. In the email client of the sharer, the sharing success prompt identification may be displayed on the display interface of the target mail. For example, in FIG. 5, a conversation icon is created on the display interface of the target mail and the sharing success prompt identification is displayed at a preset location in the conversation icon, thereby prompting the sharer that the target mail has been shared successfully.

In an embodiment, in response to a detection of the mail viewing operation triggered for the target mail by the sharer or in response to a click operation on the displayed sharing success prompt identification, the displayed sharing success prompt identification can be deleted, thereby allowing the display interface to be more concise.

In an embodiment, the process of displaying the sharing success prompt identification on the mail display interface of the target mail in the email client of the sharer may include: in response to a detection of an unread message sent by the sharee in the IM client of the sharer, displaying an unread message prompt identification, instead of the displayed sharing success prompt identification. The unread message prompt identification may be used to prompt the sharer that there is an unread message sent by the sharee presently. For example, the unread message prompt identification may include but not limited to an unread message icon or the number of unread messages.

After the target mail is shared to the IM client of the sharee according to IM information of the sharee, the sharee may send IM message to the sharer by the IM client of the sharee. If the sharer does not view the IM message sent by the sharee in a timely manner, that is, there is an unread message sent by the sharee in the IM client of the sharer, the IM server adds unread message information to a message queue. The mail client of the sharer subscribes this message queue; obtains the unread message information in real time, when there is an unread message sent by the sharee; and determines, based on the unread message information, the number of unread messages or that there is the unread message sent by the sharee presently. If the sharer does not view the shared target mail or does not click the displayed sharing success prompt identification, that is, the sharing success prompt identification is still displayed on the mail display interface at a current time instant, an unread message prompt identification is displayed instead of the displayed sharing success prompt identification. For example, an unread message prompt identification is displayed at the top of the conversation icon in FIG. 5, instead of the displayed sharing success prompt identification. In this way, the unread message is prompted more conveniently, and thus the sharer can timely know that there is an unread message in the IM client, thereby further improving user experience.

Second Embodiment

Figure 6:
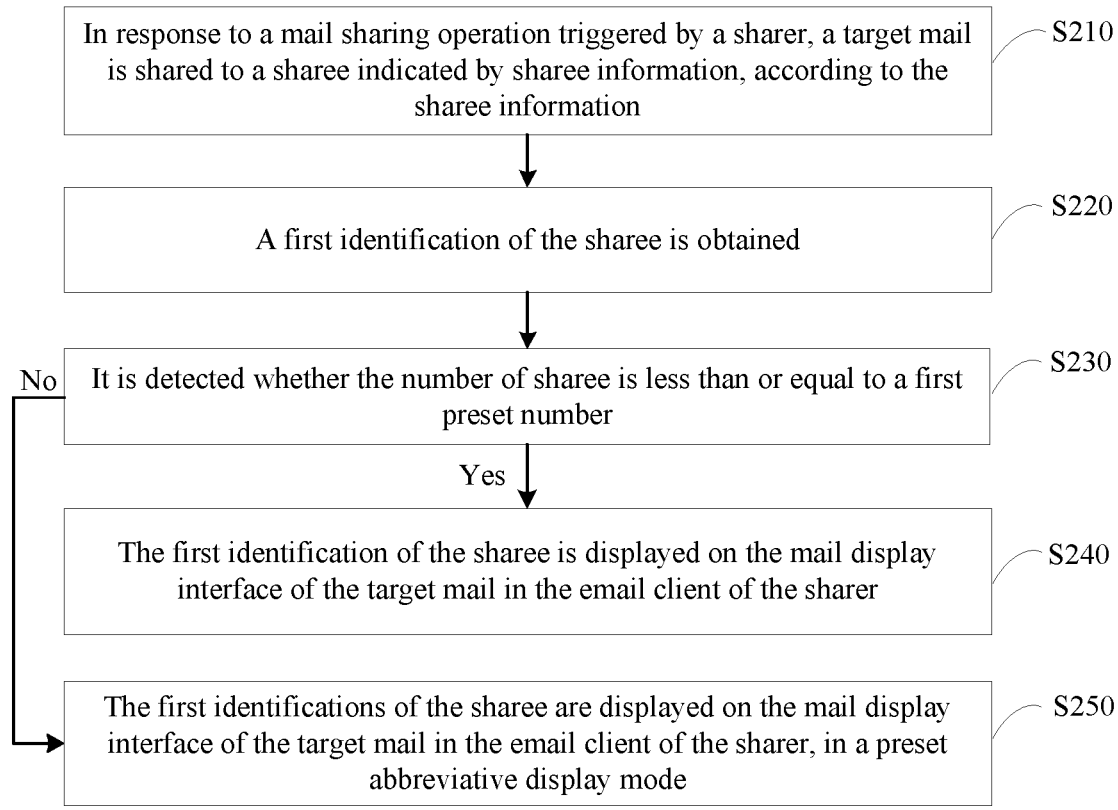
FIG. 6 is a schematic flowchart of an information display method according to a second embodiment of the present disclosure.

FIG. 6 is a schematic flowchart of an information display method according to a second embodiment of the present disclosure. The embodiment may be combined with the above embodiments. In the embodiment, a display mode of the first identification of the sharee is optimized. Explanation of the same or corresponding terms relative to the above embodiments is not described in detail herein.

Referring to FIG. 6, the information display method according to the embodiment includes steps S210 to S250 as follows.

In S210, in response to a mail sharing operation triggered by a sharer, a target mail is shared to a sharee indicated by sharee information, according to the sharee information.

In S220, a first identification of the sharee is obtained.

In S230, it is detected whether the number of the sharee is less than or equal to a first preset number; if the number of the sharee is less than or equal to the first preset number, the method proceeds to S240; and if the number of the sharee is greater than the first preset number, the method proceeds to S250.

The first preset number may be the maximum number of the first identifications of the sharees which can be displayed on a mail display interface of the target mail, which may be set based on a size of a blank region in the mail display interface and service requirement.

The first identifications of the sharees are displayed in an appropriate display mode based on the number of the sharees, thereby allowing the mail display interface to be more concise and thus improving user experience.

In S240, the first identification of the sharee is displayed on the mail display interface of the target mail in the email client of the sharer.

In an embodiment, if it is detected that the number of the sharees is less than or equal to the first preset number, the first identifications of sharees are displayed on the mail display interface of the target mail, so that the sharer can intuitively see all users receiving the target mail based on the first identifications.

In S250, the first identifications of the sharees are displayed on the mail display interface of the target mail in the email client of the sharer, in a preset abbreviative display mode.

If it is detected that the number of the sharee is greater than the first preset number, the first identifications of the sharees are displayed in a preset abbreviative display mode, so as to avoid disorder of the display interface due to the simultaneous display of the first identifications of all the sharees, thereby saving the display space and allowing the mail display interface to be more concise.

In an embodiment, S250 may include: displaying a first abbreviative display identification on the mail display interface of the target mail in the email client of the sharer; and if a viewing operation triggered for the first abbreviative display identification by the sharer is detected, displaying the first identifications of at most the second preset number of sharees among all the sharees. The second preset number is preset, which is the maximum number of the sharees which can be displayed on an abbreviative display interface corresponding to the first abbreviative display identification.

In an embodiment, if it is detected that the number of the sharee is greater than the first preset number, only one first abbreviative display identification is displayed on the mail display interface, and the first identifications of all the sharees may be displayed by the first abbreviative display identification. For example, a viewing operation triggered for the first abbreviative display identification by the sharer is detected, for example, the sharer triggers the viewing operation by clicking the displayed first abbreviative display identification. In this case, an abbreviative display interface corresponding to the first abbreviative display identification is displayed, and the first identifications of at most the second preset number of sharees are displayed on the abbreviative display interface. For example, if the number of the sharee is less than or equal to the second preset number, the first identifications of all sharees are simultaneously displayed on the abbreviative display interface. If the number of the sharees is greater than the second preset number, the first identifications of the sharees are displayed in page turning manner on the abbreviative display interface page by page. For example, the first identifications of the second preset number of sharees are displayed on the first page, and the first identifications of remaining sharees are displayed on subsequent at least one page.

In an embodiment, the method may further include: displaying the total number of the sharees at a preset location of the first abbreviative display identification. The preset location of the first abbreviative display identification may be a blank location near the first abbreviative display identification or a location where the first abbreviative display identification is located. The total number of the sharees is displayed at the preset location of the first abbreviative display identification, so that the sharer can quickly know the total number of users receiving the mail, thereby further improving user experience.

According to the technical solution described in the embodiments of the present disclosure, the first identifications of the sharees may all be displayed or may be displayed in an abbreviative display mode, based on the number of the sharees, thereby allowing the mail display interface to be more concise and improving user viewing experience.

Based on the above technical solutions, S250 may include: displaying the second abbreviative display identification and the first identifications of the first preset number of sharees on the mail display interface of the target mail in the email client of the sharer; if a viewing operation triggered for the second abbreviative display identification by the sharer is detected, displaying the first identifications of at most the third preset number of sharees among remaining sharees, or displaying the first identifications of at most the third preset number of sharees among all the sharees. The third preset number is preset and is the maximum number of sharees which can be displayed on the abbreviative display interface corresponding to the second abbreviative display identification.

In an embodiment, if it is detected that the number of the sharee is greater than the first preset number, the first identifications of the first preset number of sharees and one second abbreviative display identification are displayed on the mail display interface. The first identifications of remaining sharees or the first identifications of all the sharees are displayed by the second abbreviative display identification. For example, a viewing operation triggered for the second abbreviative display identification by the sharer is detected. For example, the sharer triggers the viewing operation by clicking the displayed second abbreviative display identification. In this case, an abbreviative display interface corresponding to the second abbreviative display identification is displayed. The first identifications of at most the third preset number of sharees among remaining sharees are displayed on the abbreviative display interface, or the first identifications of at most the third preset number of sharees among all sharees are displayed on the abbreviative display interface. For example, in the case that the first identifications of remaining sharees are displayed based on the second abbreviative display identification, if the number of remaining sharees is less than or equal to the third preset number, the first identifications of all remaining sharees are simultaneously displayed on the abbreviative display interface. If the number of the remaining sharees is greater than the third preset number, the first identifications of the remaining sharees may be displayed in a page turning manner. For example, the first identifications of the third preset number of sharees among the remaining sharees are displayed on a first page, and the first identifications of other undisplayed sharees among the remaining sharees are displayed on subsequent at least one page. In another example, in the case that the first identifications of all sharees are displayed based on the second abbreviative display identification, if the number of the sharees is less than or equal to the third preset number, the first identifications of all sharees are simultaneously displayed on the abbreviative display interface. If the number of the sharees is greater than the third preset number, the first identifications of all the sharees may be displayed in a page turning manner. For example, the first identifications of the third preset number of sharees among all the sharees are displayed on a first page, and the first identifications of remaining sharees are displayed on subsequent at least one page.

In an embodiment, the method may further include: displaying the total number of remaining sharees or the total number of the sharees at a preset location of the second abbreviative display identification. The preset location of the second abbreviative display identification may be a blank location near the second abbreviative display identification, or a location where the second abbreviative display identification is located. The total number of remaining sharees or the total number of the sharees is displayed at the preset location of the second abbreviative display identification, so that the sharer can quickly know the total number of first identifications which is not displayed or the total number of users receiving the mail, thereby further improving user experience.

FIG. 7 shows an example of a first identification of a sharee. As shown in FIG. 7, the sharer shares the target mail to 20 users, avatars of two users and one second abbreviative display identification are displayed on the mail display interface, and the total number of first identifications which is not displayed, i.e., "+18" is displayed on the left of the second abbreviative display identification. In this way, the sharer can know that the target mail is shared with 20 users. The sharer triggers a viewing operation by clicking the second abbreviative display identification, to view avatars of remaining sharees or avatars of all sharees, so that the sharer can quickly know users receiving the target mail.

Third Embodiment

FIG. 8 is a schematic flowchart of an information display method according to a third embodiment of the present disclosure. The embodiment may be combined with the above embodiments. In the embodiment, after the first identifications of the sharees are displayed on the mail display interface of target mail in the email client of the sharer, the following step is added: displaying, in response to a detection that an unread message sent by the sharee exists in an IM client of the sharer, an unread message prompt identification at a preset location of the first identification of the sharee. Explanation of the same or corresponding terms relative to the above embodiments is not described in detail herein.

Referring to FIG. 8, the information display method according to the embodiment includes S310 to S340 as follows.

In S310, in response to a mail sharing operation triggered by a sharer, a target mail is shared with a sharee indicated by sharee information, according to the sharee information.

In S320, a first identification of the sharee is obtained.

In S330, the first identification of the sharee is displayed on a mail display interface of the target mail in an email client of the sharer.

In S340, in response to a detection that an unread message sent by the sharee exists in an IM client of the sharer, an unread message prompt identification is displayed at a preset location of the first identification of the sharee.

The unread message may be an IM message which is sent from the sharee to the sharer and is in an unread state (the sharer does not view). The unread message prompt identification may include but not limited to an unread message icon or the number of unread message. The preset location of the first identification of the sharee may be any location near the first identification, for example, the top of the first identification.

In an embodiment, after the target mail is shared with the IM client of the sharee according to IM information of the sharee, the sharee may send an IM message to the sharer in the IM client of the sharee. If the sharer does not view the IM message sent by the sharee timely, that is, there is an unread message sent by the sharee in the IM client of the sharer, the IM server adds the unread message to a message queue. The email client of the sharer subscribes the message queue; obtains unread message information in real time, when there is an unread message sent by the sharee; and determines, based on the unread message information, that there is the unread message sent by the sharee presently. In an embodiment, in the case of multiple sharees, the unread message information may include the identification of the sharee sending the unread message, so that the email client of the sharer can determine the sharee currently sending the unread message based on the identification of the sharee in the unread message information. An unread message prompt identification is displayed at the preset location of the first identification of the sharee, to prompt the sharer that an unread message sent by the sharee exists presently. The sharer manually opens the IM client based on the displayed unread message prompt identification, so as to view the unread message sent by the sharee in the IM client timely, thereby further improving user experience.

For example, it is assumed that the sharer shares the target mail to three IM users, that is, users A, B and C. If the user A sends a message to the sharer in the IM client and the sharer does not view the message in a timely manner, the email client of the sharer can detect that an unread message sent by the user A exists. In this case, an unread message prompt identification is displayed at a preset location of the first identification of the user A on the mail display interface, so as to prompt the sharer that an unread message sent by the user A exists presently, thereby viewing the unread message by the sharer timely and thus improving user experience.

In an embodiment, the displaying an unread message prompt identification at a preset location of the first identification of the sharee in S340 may include: obtaining the total number of unread messages sent by the sharee, and displaying the total number of unread messages at the preset location of the first identification of the sharee.

The unread message information subscribed by the email client of the sharer may include: the total number of unread messages sent by the sharee. In this case, the sharer can obtain the total number of unread messages sent by the sharee based on the obtained unread message information. The total number of unread messages is displayed at the preset location of the first identification of the sharee, so that the sharer can quickly obtain the total number of unread messages at a current time instant, thereby further improving user experience.

According to the technical solution described in the embodiment of the present disclosure, when it is detected that an unread message sent by the sharee exists in the IM client of the sharer, the unread message prompt identification or the number of unread messages is displayed at the preset location of the first identification of the sharee, so that the sharer can know that the unread message sent by the sharee exists in the IM client timely, thereby viewing the message in a timely manner and thus improving user experience.

Based on the above technical solution, S340 may include: if the sharee is an IM user in an IM user group, displaying, in response to a detection that an unread message for the sharer exists in the IM user group, an unread message prompt identification at the preset location of the first identification of a preset IM user in the IM user group.

The preset IM user may be any preset user in the IM user group. For example, a group master of the IM user group or an IM user of which a first identification is displayed at the front, may be set as the preset IM user.

When the target mail is shared with the IM user in the IM user group according to information of the IM user group of the sharee, the first identification of each IM user in the IM user group is displayed on the mail display interface of the target mail. The email client of the sharer may detect whether an unread message for the sharer exists in the IM user group in a timely manner. If the unread message for the sharer exists in the IM user group, an unread message prompt identification is displayed at the preset location of the first identification of the preset IM user in the IM user group, to prompt the sharer that the unread message exists in the user group of the preset IM message. The unread message prompt identification is displayed at the preset location of the first identification of the preset IM user, thereby allowing the display interface to be more concise.

In an embodiment, the total number of unread messages in the IM user group presently can be determined according to the unread message sent by each IM user in the IM user group. The total number of unread messages is displayed at the preset location of the first identification of the preset IM user, to prompt the sharer the accurate number of unread messages in the IM user group.

In an embodiment, in response to the detection that the unread message for the sharer exists in the IM user group, each target IM user who sends the unread message is determined in the IM user group, and an unread message prompt identification is displayed at the preset location of the first identification of each target IM user, so as to prompt the sharer a specific user who sends the unread message in the IM user group. For example, the number of unread messages sent by each target IM user is obtained, and the number of unread messages is displayed at the preset location of the first identification of the target IM user, so as to prompt the sharer the number of unread messages sent by the target IM user.

Based on the above technical solution, after S340, the method may include: deleting the displayed unread message prompt identification, in response to a detection of a message viewing operation triggered for the displayed unread message prompt identification by the sharer.

The sharer may trigger the message viewing operation by clicking the displayed unread message prompt identification. If the email client of the sharer detects the message trigger operation, it is indicated that the sharer has known the prompt message. In this case, the displayed unread message prompt identification is deleted, thereby ensuring accuracy of the unread message prompt.

Based on the above technical solution, after S340, the method may include: displaying an IM conversation interface of the sharee, in response to a detection of a message viewing operation triggered for the displayed unread message prompt identification by the sharer. The IM conversation interface contains the unread message sent by the sharee.

The sharer may trigger the message viewing operation by clicking the displayed unread message prompt identification. In response to that a message trigger operation detected by the email client of the sharer, the IM conversation interface of the sharee corresponding to the unread message prompt identification is automatically displayed, so that the user can view the unread message sent by the sharee timely in the IM conversation interface without manual searching, thereby further improving the searching efficiency.

In an embodiment, the displaying an IM conversation interface of the sharee may include: jumping to an IM client of the sharer, and displaying the IM conversation interface of the sharee on an interface of the IM client of the sharer; or obtaining an unread message sent by the sharee and displaying the IM conversation interface containing the unread message on the email client interface of the sharer.

The email client and the IM client of the sharer may be different clients. Alternatively, the email client and the IM client of the sharer may be different functional modules in the same client, such that the email client can communicate with the IM client more conveniently.

In response to the detection of the message viewing operation, the email client of the sharer may automatically jump to the IM client of the sharer, and an IM conversation interface of the sharee is displayed on the IM client interface of the sharer, thereby automatically displaying the unread messages. For example, if the information of the sharee is the IM user group information, the IM user group conversation interface corresponding to the IM user group information may be displayed by jumping to the IM client of the sharer.

Alternatively, the unread message information subscribed by the email client of the sharer may include: a specific unread message sent by the sharee. The sharer can obtain the unread message sent by the sharee based on the unread message information. The email client of the sharer adds the obtained unread message to a pre-established IM conversation, and an IM conversation interface containing the unread message is displayed via a popup window in the email client of the sharer. For example, the IM conversation interface including the unread message may be displayed at the right of the mail display interface of the target mail, so that the sharer can simultaneously view the target mail and the unread message in the email client, thereby further improving user experience.

Fourth Embodiment

Figure 9:
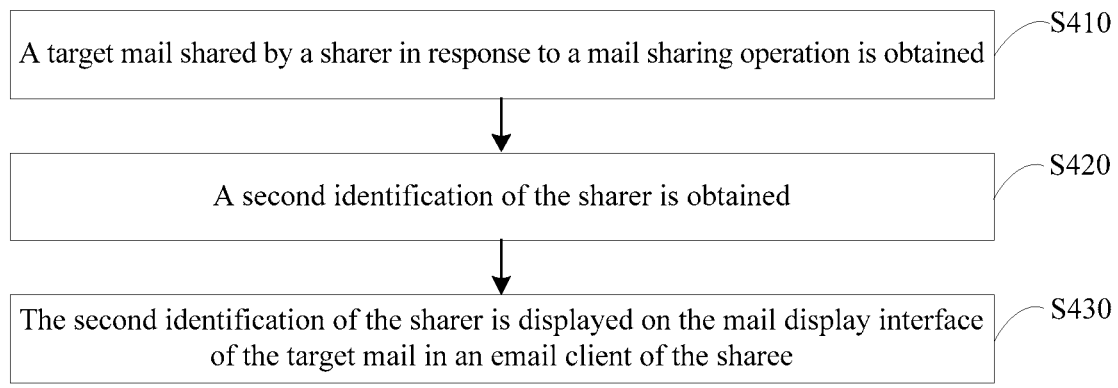
FIG. 9 is a schematic flowchart of an information display method according to a fourth embodiment of the present disclosure.

FIG. 9 is a schematic flowchart of an information display method according to a fourth embodiment of the present disclosure. The embodiment may be applied to a case that an identification of the sharer is displayed on a target mail shared by the sharer. The method may be performed by an information display apparatus. The apparatus may be implemented as software and/or hardware, and is integrated in the email client of the sharee. The email client may be integrated in a PC (Personal Computer) end or a mobile terminal. The same or corresponding terms relative to the above embodiments are not described in detail herein. As shown in FIG. 9, the method includes S410 to S430 as follows.

In S410, a target mail shared by a sharer in response to a mail sharing operation is obtained.

As described in the above embodiments, the email client of the sharer shares the target mail with the sharee indicated by the email information of the sharee based on the mail information of the sharee, in response to the mail sharing operation triggered by the sharer. The email client of the sharee can obtain the target mail shared by the sharer.

In S420, a second identification of the sharer is obtained.

Each sharer may have a unique second identification, so that different sharers can be distinguished by different second identifications. The second identification of the sharer may include an avatar identification and/or an account identification of the sharer. If the sharer shares the target mail to only the email client of the sharee, the identification of the sharer in the email client serves as the second identification of the sharer. If the sharer shares the target mail to both the IM client and the email client of the sharee, the identification of the sharer in the IM client or the identification of the sharer in the email client serves as the second identification of the sharer.

The email client of the sharer may share the target mail and the second identification of the sharer to the email client of the sharee. The email client of the sharee simultaneously obtains the target mail and the second identification of the sharer. If the second identification of the sharer is pre-stored in the email client of the sharee, the identification of the sharer can be obtained locally. If the second identification of the sharer is not stored in the email client of the sharee, the second identification of the sharer may be obtained by invoking an IM server or the email server. If the target mail is shared with both the IM client and the email client of the sharee, the email client of the sharee can obtain an IM account identification or an IM avatar identification as the second identification, by invoking the IM server.

In S430, the second identification of the sharer is displayed on the mail display interface of the target mail in the email client of the sharee.

Any blank position in the mail display interface may serve as a preset position for displaying the second identification. In an embodiment, if mails are classified and stored in a form of email group in the email and the received target mail is each mail in the mail group, the second identification of the sharer may be displayed on a mail display interface of each target mail; or the second identification of the sharer is displayed on a display interface of a mail group including the target mail, to uniformly notify users of the sharer sharing the mail in the mail group.

After the sharer shares the target mail with the sharee, the second identification of the sharer may be displayed at the preset position in the mail display interface of the target mail in the email client of the sharee, so as to prompt the sharee of the sharer sharing the target mail. In this way, the sharee can quickly view who shares the target mail in the email client directly without switching to the email client. For example, the sharee is unnecessary to switch from the email client to the IM client so as to view who shares the target mail based on a sharing record in the IM client. Thus, the viewing operation of the sharee is simplified, and the information viewing efficiency and user experience are improved.

According to the technical solution described in the embodiment of the present disclosure, after the target mail is shared with the sharee indicated by the sharee information according to the sharee information in response to the mail sharing operation triggered by the sharer, the second identification of the sharer is displayed on the mail display interface of the target mail in the email client of the sharee. In this way, the sharee can quickly view who shares the target mail directly in the email client, thereby improving the information viewing efficiency and user experience.

Based on the above technical solutions, S430 may include: obtaining a first identification of the sharee of the target mail; and displaying the first identification and the second identification on the mail display interface of the target mail in the client of the sharee.

The sharee of the target mail may include all or a part of the sharees receiving the target mail.

In the case of only one sharee, the first identification of the sharee can be obtained from a local terminal of the sharee. In the case of at least two sharees, the email client of the current sharee can obtain the first identification of other sharee locally or by invoking a server. In the embodiment, the second identification of the sharer and the first identification of the sharee other than the current sharee are displayed on the mail display interface of the target mail in the client of the sharee, so as to prompt the sharee of the sharer for sharing the target mail and other users receiving the target mail. Alternatively, the second identification of the sharer and the first identification of all sharees are displayed on the mail display interface, so as to prompt the sharee of the sharer for sharing the target mail and all users receiving the target mail. In this way, the sharee can quickly view the user sharing the target mail and the users receiving the target mail on the mail display interface without switching between the clients, thereby further simplifying the viewing operation of the sharee and improving the information viewing efficiency and user experience.

In an embodiment, if the target mail is shared to the email client of the sharee, the first identification and the second identification may be displayed in the email client of the sharee in a similar manner as in the mail client of the sharer. For example, if the total number of the sharer and the sharees is less than or equal to a first preset number, the second identification of the sharer and the first identifications of all sharees are displayed on the mail display interface of the target mail in the email client of the sharee. If the total number of the sharer and the sharees is greater than the first preset number, the second identification of the sharer and the first identifications of the sharees are displayed in a preset abbreviative display mode on the mail display interface of the target mail in the email client of the sharee.

If the target mail is shared with both the IM client and the email client of the sharee, an unread message is prompted in the email client of the sharee in a similar manner as in the mail client of the sharer. For example, after the second identification and the first identification are displayed on the mail display interface of the target mail in the email client of the sharee, the email client of the sharee detects an unread message sent by the sharer or by other sharee in the IM client of the sharee, so as to prompt the sharee that there is the unread message. In this case, an unread message prompt identification is displayed at a preset location of the corresponding identification, thereby viewing the unread message by the sharee timely and thus improving user experience.

Based on the above technical solution, the displaying the first identification and the second identification on the mail display interface of the target mail in the client of the sharee may include: ranking the first identification and the second identification in a preset ranking mode; and displaying the ranked first identification and second identification on the mail display interface of the target mail in the client of the sharee.

The first identification and the second identification are ranked in the preset ranking mode, so that the second identification of the sharer can be displayed at a fixed location. For example, the second identification is ranked in front of all first identifications. In this way, the second identification of the sharer is displayed at first, so that the sharee can determine the sharer directly based on the second identification. Thus, the sharer and the sharee can be effectively distinguished based on the display location, thereby avoiding confusion and thus further improving user experience.

Embodiments of an information display apparatus are provided below according to an embodiment of the present disclosure. The apparatus shares the same invention concept as the information display method described in the above embodiments. For content not described in detail in the embodiments of the information display apparatus, one may refer to the description of the method embodiments.

Fifth Embodiment

Figure 10:
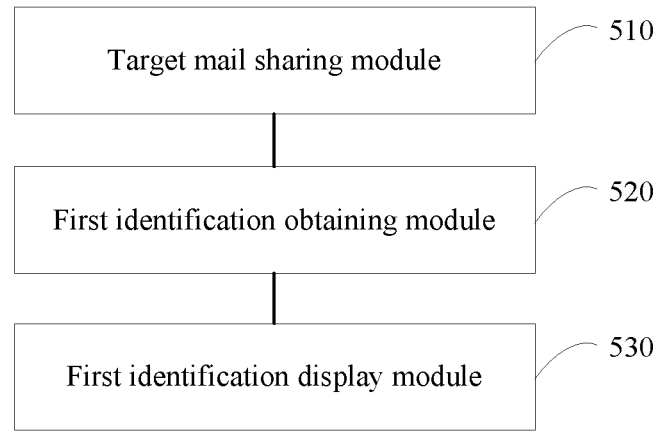
FIG. 10 is a schematic structural diagram of an information display apparatus according to a fifth embodiment of the present disclosure.

FIG. 10 is a schematic structural diagram of an information display apparatus according to a fifth embodiment of the present disclosure. The embodiment may be applied to a case that sharee information is displayed on a shared target mail. The apparatus includes a target mail sharing module 510, a first identification obtaining module 520 and a first identification display module 530.

The target mail sharing module 510 is configured to share, in response to a mail sharing operation triggered by a sharer, a target mail with a sharee indicated by sharee information according to the sharee information. The first identification obtaining module 520 is configured to obtain a first identification of the sharee. The first identification display module 530 is configured to display the first identification of the sharee on a mail display interface of the target mail in an email client of the sharer.

According to the technical solution in an embodiment of the present disclosure, after the target mail is shared to the sharee indicated by the sharee information according to the sharee information in response to a mail sharing operation triggered by a sharer, the first identification of the sharee is displayed on the mail display interface of the target mail in the email client of the sharer. In this way, the sharer can quickly view the users receiving the target mail directly in the email client, thereby improving the information viewing efficiency and user experience.

Based on the above technical solutions, the first identification includes an avatar identification and/or an account identification of the sharee.

Based on the above technical solutions, the first identification obtaining module 520 is configured to if the sharee information includes a user group name, determine the first identification of the sharee according to the user group name.

Based on the above technical solutions, the user group name includes an instant messaging IM user group name. The first identification obtaining module 520 is configured to generate an identification obtaining request according to the IM user group name; send the identification obtaining request to an IM server, to instruct the IM server to determine identifications of respective IM users indicated by the IM user group name in response to the identification obtaining request; and obtain the first identifications of the sharees according to the identifications of the IM users sent by the IM server.

Based on the above technical solution, the first identification display module 530 includes a first display unit and a second display unit.

The first display unit is configured to if the number of the sharees is less than or equal to a first preset number, display the first identifications of the sharees on the mail display interface of the target mail in the email client of the sharer.

The second display unit is configured to if the number of the sharees is greater than the first preset number, display the first identifications of the sharees on the mail display interface of the target mail in the email client of the sharer in a preset abbreviative display mode.

Based on the above technical solution, the second display unit is configured to display a first abbreviative display identification on the mail display interface of the target mail in the mail client of the sharer; and in a case that a viewing operation on the first abbreviative display identification triggered by the sharer is detected, display the first identifications of at most a second preset number of sharees among all sharees; or display a second abbreviative display identification and the first identification of the first preset number of sharee on the mail display interface of the target mail in the email client of the sharer; and in a case that a viewing operation on the second abbreviative display identification triggered by the sharer is detected, display the first identifications of at most a third preset number of sharees among remaining sharees or display the first identifications of at most a third preset number of sharees among all sharees.

Based on the above technical solutions, the apparatus further includes: an identification number display module configured to display the total number of the sharees at a preset location of the first abbreviative display identification; or display the total number of the remaining sharees or the total number of all sharees at a preset location of the second abbreviative display identification.

Based on the above technical solutions, the apparatus further includes: an unread message prompt module configured to, in response to a detection that an unread message sent by the sharee exists in an IM client of the sharer, display an unread message prompt identification at a preset location of the first identification of the sharee, after the first identification of the sharee is displayed on the mail display interface of the target mail in the email client of the sharer.

Based on the above technical solutions, the unread message prompt module is further configured to obtain the total number of unread messages sent by the sharee; and display the total number of unread messages at the preset location of the first identification of the sharee.

Based on the above technical solutions, the unread message prompt module is further configured to if the sharee is an IM user in an IM user group, display the unread message prompt identification at a preset location of a first identification of a preset IM user in the IM user group, in response to a detection that an unread message for the sharer exists in the IM user group.

Based on the above technical solution, the apparatus further includes: an unread message display module configured to display an IM conversation interface of the sharee, in response to a detection of a message viewing operation on the displayed unread message prompt identification triggered by the sharer, after the unread message prompt identification is displayed at the preset location of the first identification of the sharee. The IM conversation interface contains the unread message sent by the sharee.

Based on the above technical solutions, the unread message display module is further configured to jump to the IM client of the sharer, and display the IM conversation interface corresponding to the sharee on an interface of the IM client of the sharer; or obtain an unread message sent by the sharee, and display an IM conversation interface containing the unread message on an interface of the email client of the sharer.

Based on the above technical solution, the apparatus further includes: an unread message identification deleting module configured to delete the displayed unread message prompt identification in response to a detection of a message viewing operation on the displayed unread message prompt identification triggered by the sharer, after the unread message prompt identification is displayed at the preset location of the first identification of the sharee.

Based on the above technical solutions, the first identification display module 530 is further configured to detect a mail viewing operation on the target mail triggered by the sharee; displaying the first identification of the sharee in a first identification display mode on the mail display interface of the target mail in the email client of the sharer, in the case that the mail viewing operation is not detected; and switch a display mode of the first identification from the first identification display mode to a second identification display mode, in the case that the mail viewing operation is detected.

Based on the above technical solutions, the apparatus further include: a first identification updating module configured to display, in response to a detection of an adding operation for adding a sharee, a first identification of a currently added sharee on the mail display interface of the target mail in the email client of the sharer; and delete, in response to a detection of a deleting operation for deleting an existing sharee, the displayed first identification of the existing sharee.

Based on the above technical solutions, the apparatus further includes: a sharing success prompt identification display module configured to display a sharing success prompt identification on the mail display interface of the target mail in the email client of the sharer, after the target mail is shared to the sharee indicated by the sharee information.

Based on the above technical solutions, the apparatus further includes: a sharing success prompt identification switching module configured to display, in response to a detection that an unread message sent by the sharee exists in an IM client of the sharer, an unread message prompt identification instead of the displayed sharing success prompt identification.

The information display apparatus according to the embodiment of the present disclosure may perform the information display method according to the first to third embodiments, and can produce the same beneficial effect as the information display method.

It should be noted that, in the embodiments of the information display apparatus, units and modules are classified according to only logic function. The classification method is not limited, as long as corresponding functions can be realized. Names of the functional units are only used to distinguish from each other, and are not intended to limit the scope of the present disclosure.

Sixth Embodiment

Figure 11:
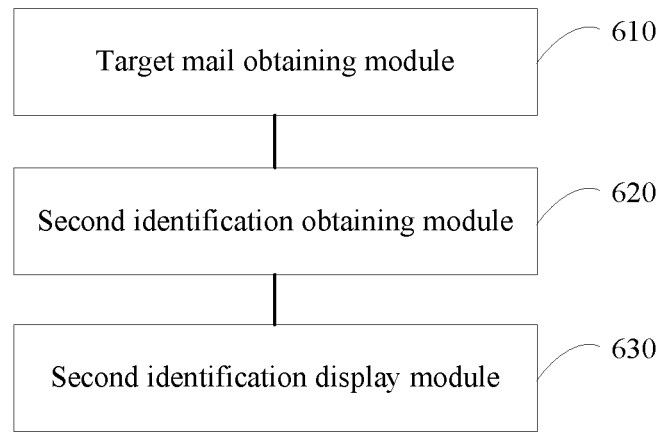
FIG. 11 is a schematic structural diagram of an information display apparatus according to a sixth embodiment of the present disclosure.

FIG. 11 is a schematic structural diagram of an information display apparatus according to a sixth embodiment of the present disclosure. The embodiment may be applied to a case that an identification of the sharer is displayed on a target mail shared by the sharer. The apparatus includes a target mail obtaining module 610, a second identification obtaining module 620 and a second identification display module 630.

The target mail obtaining module 610 is configured to obtain a target mail which is shared by a sharer in response to a mail sharing operation. The second identification module 620 is configured to obtain a second identification of the sharer. The second identification display module 630 is configured to display the second identification of the sharer on a mail display interface of the target mail in an email client of a sharee.

According to the technical solution described in the embodiment of the present disclosure, after the target mail is shared to the sharee indicated by the sharee information according to the sharee information in response to the mail sharing operation triggered by the sharer, the second identification of the sharer is displayed on the mail display interface of the target mail in the email client of the sharee. In this way, the sharee can quickly view who shares the target mail directly in the email client, thereby improving the information viewing efficiency and user experience.

Based on the above technical solutions, the second identification display module 630 includes a first identification obtaining unit and an identification display unit.

The first identification obtaining unit is configured to obtain a first identification of the sharee of the target mail.

The identification display unit is configured to display the first identification and the second identification on the mail display interface of the target mail in the client of the sharee.

Based on the above technical solutions, the identification display unit is configured to: rank the first identification and the second identification in a preset ranking mode; and display the ranked first identification and second identification on the mail display interface of the target mail in the client of the sharee.

The information display apparatus according to the embodiment of the present disclosure may perform the information display method according to the fourth embodiment, and can produce the same beneficial effect as the information display method.

It should be noted that, in the embodiments of the information display apparatus, units and modules are classified according to only logic function. The classification method is not limited, as long as corresponding functions can be realized. Names of the functional units are only used to distinguish from each other, and are not intended to limit the scope of the present disclosure.

Seventh Embodiment

Figure 12:
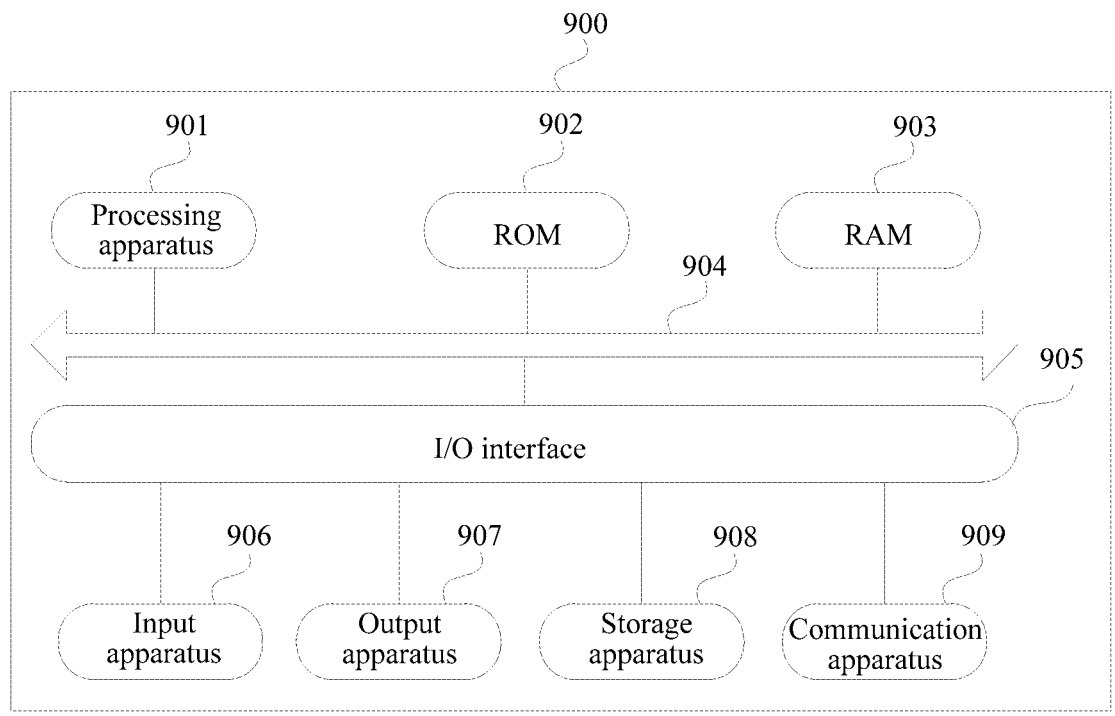
FIG. 12 is a schematic structural diagram of an electronic device according to a seventh embodiment of the present disclosure.

Reference is made to FIG. 12 which shows a schematic structural diagram of an electronic device 900 for implementing the embodiments of the present disclosure (for example, the terminal device or the server shown in FIG. 12). The terminal device according to the embodiment of the present disclosure may include but not limited to a mobile terminal such as a mobile phone, a notebook computer, a digital broadcast sharee, a personal digital assistance (PDA), a tablet computer (PAD), a portable multimedia player (PMP) and a vehicle terminal (for example a vehicle navigation terminal); and a fixed terminal such as digital TV and a desktop computer. The electronic device in FIG. 12 is schematic, and is not intended to limit the function and use scope of the embodiments of the present disclosure.

As shown in FIG. 12, the electronic device 900 may include a processing apparatus (such as a central processor and a graphic processor) 901. The processing apparatus may perform various appropriate actions and processing by executing programs stored in a read-only memory (ROM) 902 or programs uploaded from a storage apparatus 908 to a random access memory (RAM) 903. Various programs and data required for operations of the electronic device 900 are also stored in the RAM 903. The processing apparatus 901, the ROM 902 and the RAM 903 are connected to each other through the bus 904. An input/output (I/O) interface 905 is also connected to the bus 904.

Generally, the following components are connected to the I/O interface 505: an input apparatus 906 such as a touch screen, a touch panel, a keyboard, a mouse, a camera, a microphone, an accelerometer, and gyroscope; an output apparatus 907 such as a liquid crystal display (LCD), a loudspeaker and a vibrator; a storage apparatus 908 such as a magnetic tape and a hard disk; and a communication apparatus 909. The communication apparatus 909 may allow the electronic device 900 to communicate with other device in a wired or wireless manner to exchange data. Although FIG. 12 shows the electronic device 900 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 909, installed from the storage apparatus 908 or installed from the ROM 902. The computer program is executed by the processing apparatus 901 to perform functions defined in the methods described in the embodiments of the present disclosure.

The electronic device according to the embodiments of the present disclosure shares the same invention concept as the information display method according to the above embodiments. For contents not described in detail in the device embodiment, one may refer to description of the above method embodiments. The electronic device can generate the same beneficial effect as the method embodiments.

Eighth Embodiment

A computer storage medium storing computer programs is provided according to embodiments of the present disclosure. The programs are executed by a processor to perform the information display method according to the above embodiments.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device.

The computer readable storage medium carries one or more programs. The one or more programs, when being executed by the electronic device, cause the electronic device to: share, in response to a mail sharing operation triggered by a sharer, a target mail with the sharee indicated by sharee information, according to the sharee information; obtain a first identification of the sharee; and display the first identification of the sharee on a mail display interface of the target mail in an email client of the sharer; or obtain a target mail which is shared by a sharer in response to a mail sharing operation; obtain a second identification of the sharer; and display the second identification of the sharer on a mail display interface of the target mail in an email client of a sharee.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the editable content display unit may be referred to as "an editing unit".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

In the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments, an information display method is provided according to a first example. The method includes:
sharing, in response to a mail sharing operation triggered by a sharer, a target mail with a sharee indicated by sharee information, according to the sharee information;
obtaining a first identification of the sharee; and
displaying the first identification of the sharee on a mail display interface of the target mail in an email client of the sharer.

According to one or more embodiments of the present disclosure, the information display method is provided according to a second example. In the method, the first identification includes an avatar identification and/or an account identification of the sharee.

According to one or more embodiments of the present disclosure, an information display method is provided according to a third example. In the method, the obtaining a first identification of the sharee includes: in the case that the sharee information includes a user group name, determining the first identification of the sharee according to the user group name.

According to one or more embodiments of the present disclosure, an information display method is provided according to a fourth example. In the method, the user group name includes an instant messaging IM user group name. The determining a first identification of the sharee according to the user group name includes:
generating an identification obtaining request according to the IM user group name;
sending the identification obtaining request to an IM server, to instruct the IM server to determine identifications of respective IM users indicated by the IM user group name in response to the identification obtaining request; and
obtaining the first identifications of the sharees according to the identifications of the IM users sent by the IM server.

According to one or more embodiments of the present disclosure, an information display method is provided according to a fifth example. In the method, the displaying the first identification of the sharee on a mail display interface of the target mail in an email client of the sharer includes:
in a case that the number of the sharees is less than or equal to a preset number, displaying the first identification of each sharee on the mail display interface of the target mail in the email client of the sharer; and
in a case that the number of the sharees is greater than the first preset number, displaying the first identifications of the sharees on the mail display interface of the target mail in the email client of the sharer in a preset abbreviative display mode.

According to one or more embodiments of the present disclosure, an information display method is provided according to a sixth example. In the method, the displaying the first identifications of the sharees on the mail display interface of the target mail in the email client of the sharer in a preset abbreviative display mode includes:
displaying a first abbreviative display identification on the mail display interface of the target mail in the email client of the sharer; and in a case that a viewing operation on the first abbreviative display identification triggered by the sharer is detected, displaying the first identifications of at most a second preset number of sharees among all sharees; or
displaying a second abbreviative display identification and the first identification of the first preset number of sharee on the mail display interface of the target mail in the email client of the sharer; and in a case that a viewing operation on the second abbreviative display identification triggered by the sharer is detected, displaying the first identifications of at most a third preset number of sharees among remaining sharees or displaying the first identification of at most a third preset number of sharees among all the sharees.

According to one or more embodiments of the present disclosure, an information display method is provided according to a seventh example. In the method, the method further includes:

displaying the total number of the sharees at a preset location of the first abbreviative display identification; or displaying the total number of the remaining sharees or the total number of all the sharees at a preset location of the second abbreviative display identification.

According to one or more embodiments of the present disclosure, an information display method is provided according to an eighth example. In the method, after the displaying the first identification of the sharee on a mail display interface of the target mail in an email client of the sharer, the method further includes:

displaying an unread message prompt identification at a preset location of the first identification of the sharee, in response to a detection that an unread message sent by the sharee exists in an IM client of the sharer.

According to one or more embodiments of the present disclosure, an information display method is provided according to a ninth example. In the method, the displaying an unread message prompt identification at a preset location of the first identification of the sharee includes:

obtaining the total number of unread messages sent by the sharee; and displaying the total number of unread messages at the preset location of the first identification of the sharee.

According to one or more embodiments of the present disclosure, [Tenth example] provides an information display method is provided according to a tenth example. In the method, the displaying an unread message prompt identification at a preset location of the first identification of the sharee, in response to a detection that an unread message sent by the sharee exists in an IM client of the sharer, includes:

in a case that the sharee is an IM user in an IM user group, displaying the unread message prompt identification at a preset location of a first identification of the IM user in the IM user group, in response to a detection that an unread message for the sharer exists in the IM user group.

According to one or more embodiments of the present disclosure, an information display method is provided according to an eleventh example. In the method, after the displaying an unread message prompt identification at a preset location of the first identification of the sharee, the method further includes:

displaying an IM conversation interface corresponding to the sharee in response to a detection of a message viewing operation on the displayed unread message prompt identification triggered by the sharer, where the IM conversation interface includes the unread message sent by the sharee.

According to one or more embodiments of the present disclosure, an information display method is provided according to a twelfth example. In the method, the displaying an IM conversation interface corresponding to the sharee includes:

jumping to the IM client of the sharer, and displaying the IM conversation interface corresponding to the sharee on an interface of the IM client of the sharer; or obtaining the unread message sent by the sharee, and displaying an IM conversation interface containing the unread message on an interface of the mail client of the sharer.

According to one or more embodiments of the present disclosure, an information display method is provided according to a thirteenth example. In the method, after the displaying an unread message prompt identification at a preset location of the first identification of the sharee, the method further includes:

deleting the displayed unread message prompt identification in response to a detection of a message viewing operation on the displayed unread message prompt identification triggered by the sharer.

According to one or more embodiments of the present disclosure, an information display method is provided according to a fourteenth example. In the method, the displaying the first identification of the sharee on a mail display interface of the target mail in an email client of the sharer includes:

detecting a mail viewing operation on the target mail triggered by the sharee;

displaying the first identification of the sharee in a first identification display mode on the mail display interface of the target mail in the email client of the sharer, in a case that the mail viewing operation is not detected; and switching a display mode of the first identification from the first identification display mode to a second identification display mode, in a case that the mail viewing operation is detected.

According to one or more embodiments of the present disclosure, an information display method is provided according to a fifteenth example. In the method, after the displaying the first identification of the sharee on a mail display interface of the target mail in an email client of the sharer, the method further includes:

displaying, in response to a detection of an adding operation for adding a sharee, a first identification of a currently added sharee on the mail display interface of the target mail in the email client of the sharer; and deleting, in response to a detection of a deleting operation for deleting an existing sharee, the displayed first identification of the existing sharee.

According to one or more embodiments of the present disclosure, an information display method is provided according to a sixteenth example. In the method, after the sharing a target mail to a sharee indicated by sharee information according to the sharee information, the method further includes:

displaying a sharing success prompt identification on the mail display interface of the target mail in the email client of the sharer.

According to one or more embodiments of the present disclosure, an information display method is provided according to a seventeenth example. In the method, the displaying a sharing success prompt identification on the mail display interface of the target mail in the email client of the sharer includes:

displaying, in response to a detection that an unread message sent by the sharee exists in an IM client of the sharer, an unread message prompt identification instead of the displayed sharing success prompt identification.

According to one or more embodiments of the present disclosure, an information display method is provided according to an eighteenth example. The method includes:

obtaining a target mail, wherein the target mail is shared by a sharer in response to a mail sharing operation;

obtaining a second identification of the sharer; and displaying the second identification of the sharer on a mail display interface of the target mail in an email client of a sharee.

According to one or more embodiments of the present disclosure, an information display method is provided according to a nineteenth example. In the method, the displaying the second identification of the sharer on a mail display interface of the target mail in an email client of a sharee includes:

obtaining a first identification of the sharee of the target mail; and displaying the first identification and the second identification on the mail display interface of the target mail in the email client of the sharee.

According to one or more embodiments of the present disclosure, an information display method is provided according to a twentieth example. In the method, the displaying the first identification and the second identification on the mail display interface of the target mail in the email client of the sharee includes:

ranking the first identification and the second identification in a preset ranking mode; and displaying the ranked first identification and second identification on the mail display interface of the target mail in the email client of the sharee.

According to one or more embodiments of the present disclosure, an information display apparatus is provided according to a twenty-first example. The apparatus includes:

a target mail sharing module configured to share, in response to a mail sharing operation triggered by a sharer, a target mail with a sharee indicated by sharee information, according to the sharee information;

a first identification obtaining module configured to obtain a first identification of the sharee; and a first identification display module configured to display the first identification of the sharee on a mail display interface of the target mail in an email client of the sharer.

According to one or more embodiments of the present disclosure, an information display apparatus is provided according to a twenty-second example. The apparatus includes:

a target mail obtaining module configured to obtain a target mail, wherein the target mail is shared by a sharer in response a mail sharing operation;

a second identification obtaining module configured to obtain a second identification of the sharer; and a second identification display module configured to display the second identification of the sharer on a mail display interface of the target mail in an email client of a sharee.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. An information display method, comprising:

sharing, in response to a mail sharing operation triggered by a sharer for a first mail group in an email client of the sharer, a target mail to a sharee indicated by sharee information as a mail according to the sharee information, wherein the first mail group comprises a plurality of emails which are grouped by a referential relationship and are shared together via the mail sharing operation, the target mail is least one mail in the first mail group, and the target mail is unmodifiable in the sharing to the sharee;

obtaining a first identification of the sharee; and displaying the obtained first identification of the sharee on a mail display interface of the first mail group in the email client of the sharer after sharing the first mail group to the sharee, wherein the sharing, in response to the mail sharing operation triggered by the sharer for the first mail group in the email client of the sharer, the target mail to the sharee indicated by sharee information as a mail according to the sharee information comprises:

determining the plurality of emails in the first mail group as to-be-shared mails, in response to the mail sharing operation for the first mail group; and determining the target mail from the to-be-shared mails.

2. The information display method according to claim 1, wherein the first identification comprises an avatar identification and/or an account identification of the sharee.

3. The information display method according to claim 1, wherein the obtaining a first identification of the sharee comprises:

in a case that the sharee information comprises a user group name, determining the first identification of the sharee according to the user group name.

4. The information display method according to claim 3, wherein the user group name comprises a mail user group name; and wherein the determining the first identification of the sharee according to the user group name comprises:

obtaining first identifications of respective mail users comprised in a mail user group indicated by the mail user group name, according to pre-stored first identifications of the mail users; or wherein the user group name comprises an instant messaging (IM) user group name; and wherein the determining a first identification of the sharee according to the user group name comprises:

generating an identification obtaining request according to the IM user group name;

sending the identification obtaining request to an IM server, to instruct the IM server to determine identifications of respective IM users indicated by the IM user group name in response to the identification obtaining request; and obtaining the first identifications of the sharees according to the identifications of the respective IM users sent by the IM server.

5. The information display method according to claim 1, further comprising:

displaying a second identification of the sharer on the mail display interface of the target mail in an email client of the sharee.

6. The information display method according to claim 1, wherein the displaying the obtained first identification of the sharee on a mail display interface of the first mail group in the email client of the sharer comprises:

in a case that the number of the sharees is less than or equal to a first preset number, displaying the first identification of each sharee on the mail display interface of the target mail in the email client of the sharer; and in a case that the number of the sharees is greater than the first preset number, displaying the first identifications of the sharees on the mail display interface of the target mail in the email client of the sharer in a preset abbreviative display mode.

7. The information display method according to claim 6, wherein the displaying the first identifications of the sharees on the mail display interface of the target mail in the email client of the sharer in a preset abbreviative display mode comprises:

displaying a first abbreviative display identification on the mail display interface of the target mail in the email client of the sharer; and in a case that a viewing operation on the first abbreviative display identification triggered by the sharer is detected, displaying the first identifications of at most a second preset number of sharees among all sharees; or displaying a second abbreviative display identification and the first identification of the first preset number of sharee on the mail display interface of the target mail in the email client of the sharer; and in a case that a viewing operation on the second abbreviative display identification triggered by the sharer is detected, displaying the first identifications of at most a third preset number of sharees among remaining sharees or displaying the first identifications of at most a third preset number of sharees among all sharees.

8. The information display method according to claim 7, further comprising:

displaying a total number of the sharees at a preset location of the first abbreviative display identification; or displaying a total number of the remaining sharees or a total number of all sharees at a preset location of the second abbreviative display identification.

9. The information display method according to claim 1, wherein after the displaying obtained the first identification of the sharee on a mail display interface of the first mail group in the email client of the sharer, the method further comprises:

displaying an unread message prompt identification at a preset location of the first identification of the sharee, in response to a detection that an unread message sent by the sharee exists in an IM client of the sharer.

10. The information display method according to claim 9, wherein the displaying an unread message prompt identification at a preset location of the first identification of the sharee comprises:

obtaining a total number of unread messages sent by the sharee; and displaying the total number of unread messages at the preset location of the first identification of the sharee.

11. The information display method according to claim 9, wherein the sharee is an IM user in an IM user group, and the displaying an unread message prompt identification at a preset location of the first identification of the sharee, in response to a detection that an unread message sent by the sharee exists in an IM client of the sharer comprises:

displaying an unread message prompt identification at a preset location of a first identification of a preset IM user in the IM user group, in response to a detection that an unread message of the sharer exists in the IM user group, wherein the preset IM user is any IM user in the IM user group.

12. The information display method according to claim 9, wherein after the displaying an unread message prompt identification at a preset location of the first identification of the sharee, the method further comprises at least one of:

displaying an IM conversation interface corresponding to the sharee, in response to a detection of a message viewing operation on the displayed unread message prompt identification triggered by the sharer, wherein the IM conversation interface comprises the unread message sent by the sharee, or deleting the displayed unread message prompt identification, in response to a detection of a message viewing operation on the displayed unread message prompt identification triggered by the sharer.

13. The information display method according to claim 12, wherein the displaying an IM conversation interface corresponding to the sharee comprises:

jumping to the IM client of the sharer, and displaying the IM conversation interface corresponding to the sharee on an interface of the IM client of the sharer; or obtaining the unread message sent by the sharee, and displaying an IM conversation interface containing the unread message on an interface of the email client of the sharer.

14. The information display method according to claim 1, wherein the displaying the obtained first identification of the sharee on a mail display interface of the first mail group in the email client of the sharer comprises:

detecting a mail viewing operation on the target mail triggered by the sharee;

displaying the first identification of the sharee in a first identification display mode on the mail display interface of the target mail in the email client of the sharer, in a case that the mail viewing operation by the sharee is not detected; and switching a display mode of the first identification from the first identification display mode to a second identification display mode, in a case that the mail viewing operation by the sharee is detected.

15. The information display method according to claim 1, wherein after the displaying the obtained first identification of the sharee on a mail display interface of the first mail group in the email client of the sharer, the method further comprises:

displaying, in response to a detection of an adding operation for adding a sharee, a first identification of a currently added sharee on the mail display interface of the target mail in the email client of the sharer; and deleting, in response to a detection of a deleting operation for deleting an existing sharee, the displayed first identification of the existing sharee.

16. The information display method according to claim 1, wherein the sharing a target mail to a sharee indicated by sharee information according to the sharee information, the method further comprises:

displaying a sharing success prompt identification on the mail display interface of the target mail in the email client of the sharer.

17. The information display method according to claim 16, further comprising:

deleting the displayed sharing success prompt identification, in response to a detection of a mail viewing operation on the target mail triggered by the sharer or in response to a detection of a clicking operation on the displayed sharing success prompt identification triggered by the sharer.

18. The information display method according to claim 16, wherein the displaying a sharing success prompt identification on the mail display interface of the target mail in the email client of the sharer comprises:

displaying, in response to a detection that an unread message sent by the sharee exists in an IM client of the sharer, an unread message prompt identification instead of the displayed sharing success prompt identification.

19. The information display method according to claim 1, wherein the obtaining a first identification of the sharee comprises:

obtaining the first identification of the sharee currently accessing the target mail.

20. An information display method, comprising:

obtaining a target mail, wherein the target mail is triggered by a sharer for a first mail group in an email client of the sharer based on a mail sharing operation, wherein the first mail group comprises a plurality of emails which are grouped by a referential relationship and are shared together via the mail sharing operation, the target mail is least one mail in the first mail group, and the target mail is unmodifiable in a sharing to a sharee content;

obtaining a second identification of the sharer; and displaying the second identification of the sharer on a mail display interface of a mail group where the target mail is located in an email client of the sharee, wherein the target mail is determined by determining the plurality of emails in the first mail group as to-be-shared mails in response to the mail sharing operation for the first mail group; and determining the target mail from the to-be-shared mails.

21. The information display method according to claim 20, wherein the displaying the second identification of the sharer on a mail display interface of a mail group where the target mail is located in an email client of a sharee comprises:

obtaining a first identification of the sharee of the target mail; and displaying the first identification and the second identification on the mail display interface of the target mail in the email client of the sharee.

22. The information display method according to claim 21, wherein the displaying the first identification and the second identification on the mail display interface of a mail group where the target mail is located in the email client of the sharee comprises:

ranking the first identification and the second identification in a preset ranking mode; and displaying the ranked first identification and second identification on the mail display interface of the target mail in the email client of the sharee.

23. A message display apparatus, comprising:

one or more processors; and a memory configured to store one or more programs, wherein the one or more programs, when executed by the one or more processors, cause the one or more processors to share, in response to a mail sharing operation triggered by a sharer for a first mail group in an email client of the sharer, a target mail to a sharee indicated by sharee information as a mail, according to the sharee information, wherein the first mail group comprises a plurality of emails which are grouped by a referential relationship and are shared together via the mail sharing operation, the target mail is least one mail in the first mail group, and the target mail is unmodifiable in the sharing to the sharee;

obtain a first identification of the sharee; and display the obtained first identification of the sharee on a mail display interface of the first mail group in the email client of the sharer after sharing the target mail to the sharee, wherein the one or more programs, when executed by the one or more processors, cause the one or more processors to:

determine the plurality of emails in the first mail group as to-be-shared mails, in response to the mail sharing operation for the first mail group; and determine the target mail from the to-be-shared mails.

24. An information display apparatus, comprising:

one or more processors; and a memory configured to store one or more programs, wherein the one or more programs, when executed by the one or more processors, cause the one or more processors to obtain a target mail, wherein the target mail is triggered by a sharer for a first mail group in an email client of the sharer based on a mail sharing operation, wherein the first mail group comprises a plurality of emails which are grouped by a referential relationship and are shared together via the mail sharing operation, the target mail is least one mail in the first mail group, and the target mail is unmodifiable in a sharing to a sharee;

obtain a second identification of the sharer; and display the second identification of the sharer on a mail display interface of a mail group where the target mail is located in an email client of the sharee, wherein the target mail is determined by determining the plurality of emails in the first mail group as to-be-shared mails in response to the mail sharing operation for the first mail group; and determining the target mail from the to-be-shared mails.

\* \* \* \* \*